United States Patent
Volvovski et al.

(10) Patent No.: US 11,221,916 B2
(45) Date of Patent: Jan. 11, 2022

(54) PRIORITIZED DATA RECONSTRUCTION IN A DISPERSED STORAGE NETWORK

(71) Applicant: International Business Machines Corporation, Armonk, NY (US)

(72) Inventors: Ilya Volvovski, Chicago, IL (US); Andrew D. Baptist, Mt. Pleasant, WI (US); Jason K. Resch, Chicago, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 433 days.

(21) Appl. No.: 16/402,170

(22) Filed: May 2, 2019

(65) Prior Publication Data

US 2019/0258546 A1 Aug. 22, 2019

Related U.S. Application Data

(63) Continuation-in-part of application No. 15/920,843, filed on Mar. 14, 2018, now Pat. No. 10,303,548.
(Continued)

(51) Int. Cl.
*G06F 16/00* (2019.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
None
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Anhtai V Tran
(74) *Attorney, Agent, or Firm* — Garlick & Markison; Timothy W. Markison; Harry Tyson, Jr.

(57) ABSTRACT

Methods and systems for use in a dispersed storage network to prioritize data rebuilding operations. In various examples, a device receives data loss information from a set of storage units. Based on the data loss information, data slice errors are detected regarding data stored by the storage units, and corresponding rebuild requests are issued to the storage units. The device also determines a rebuild rate based on a rate of rebuilding associated with the rebuild requests. The device further receives storage error information regarding errors associated with storage requests to the storage units and, based on the data loss information and storage error information, determines a data loss rate. The rebuild rate and the data loss rate are provided to the storage units for use in prioritizing the rebuild requests, such that when the rebuild rate compares unfavorably to the data loss rate, rebuild requests are prioritized over storage requests.

20 Claims, 6 Drawing Sheets

Related U.S. Application Data which is a continuation of application No. 15/428,390, filed on Feb. 9, 2017, now Pat. No. 9,921,907, which is a continuation of application No. 14/306,335, filed on Jun. 17, 2014, now Pat. No. 9,652,470.

(60) Provisional application No. 61/841,625, filed on Jul. 1, 2013.

(51) Int. Cl.
| | |
|---|---|
| *G06F 16/23* | (2019.01) |
| *G06F 16/182* | (2019.01) |
| *G06F 3/06* | (2006.01) |
| *H04L 29/08* | (2006.01) |
| *G06F 11/00* | (2006.01) |

(52) U.S. Cl.
CPC .......... *G06F 3/0619* (2013.01); *G06F 3/0659* (2013.01); *G06F 11/00* (2013.01); *G06F 11/10* (2013.01); *G06F 16/182* (2019.01); *G06F 16/2379* (2019.01); *H04L 67/1097* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,002,805 | B1 | 4/2015 | Barber et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0289122 | A1 | 11/2011 | Grube et al. |
| 2012/0054581 | A1* | 3/2012 | Grube ................... G06F 3/0647 714/769 |
| 2014/0215147 | A1* | 7/2014 | Pan ...................... G06F 11/1092 711/114 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

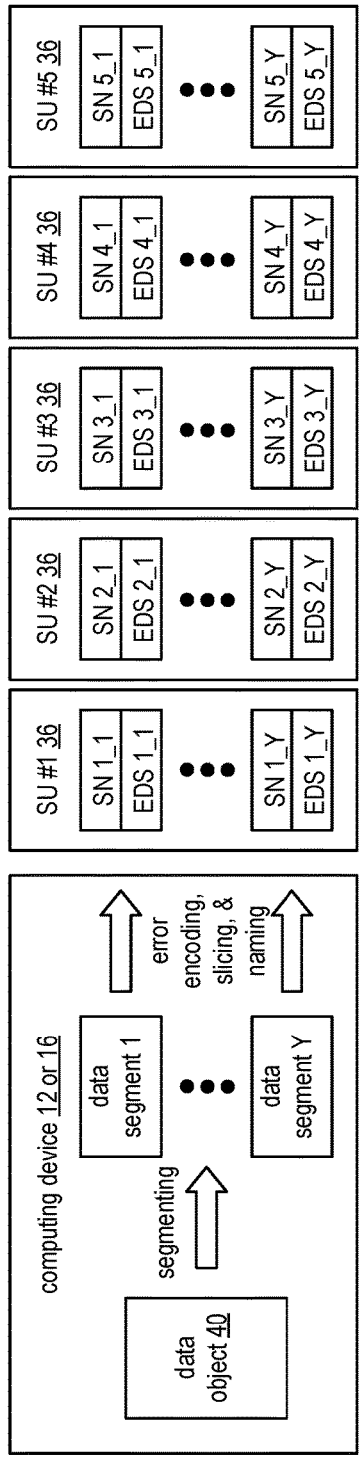

PRIORITIZED DATA RECONSTRUCTION IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/920,843, entitled "TIME-SENSITIVE DATA STORAGE OPERATIONS IN A DISPERSED STORAGE NETWORK," filed Mar. 14, 2018, which claims priority pursuant to 35 U.S.C. § 120 as a continuation of U.S. Utility application Ser. No. 15/428,390, entitled "TIME-SENSITIVE DATA STORAGE OPERATIONS IN A DISPERSED STORAGE NETWORK," filed Feb. 9, 2017 and now issued as U.S. Pat. No. 9,921,907, which claims priority pursuant to 35 U.S.C. § 120 as a continuation of U.S. Utility application Ser. No. 14/306,335, entitled "STORING DATA IN A DISPERSED STORAGE NETWORK", filed Jun. 17, 2014 and now issued as U.S. Pat. No. 9,652,470, which in turn claims priority pursuant to 35 U.S.C. § 119(e) to U.S. Provisional Application No. 61/841,625, entitled "PRIORITIZING TASKS IN A DISPERSED STORAGE NETWORK", filed Jul. 1, 2013, all of which are hereby incorporated herein by reference in their entirety and made part of the present U.S. Utility Patent Application for all purposes.

BACKGROUND

This invention relates generally to computer networks and, more specifically, to rebuilding data in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

SUMMARY

According to embodiments of the present disclosure, novel methods and systems are presented for use in a dispersed storage network (DSN) to prioritize data rebuilding operations. In various examples, a computing device (e.g., an integrity processing unit) of the DSN receives data loss information from a set of storage units of the DSN. Based on the data loss information, the computing device detects one or more slice errors regarding data stored by the set of storage units. In response to detecting slice errors, the computing device issues rebuild requests to the set of storage units for data associated with the slice errors. The computing device also determines a rebuild rate based on a rate of rebuilding associated with the rebuild requests. The computing device further receives storage error information regarding errors associated with storage requests to the set of storage units and, based on the data loss information and storage error information, determines a data loss rate. The rebuild rate and the data loss rate are provided to the set of storage units for use in determining whether to prioritize the rebuild requests. For example, when the rebuild rate compares unfavorably to the data loss rate, rebuild requests are prioritized over the storage requests, thereby minimizing any potential for irreversible data loss.

BRIEF DESCRIPTION OF THE DRAWINGS

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION

Figure 1:
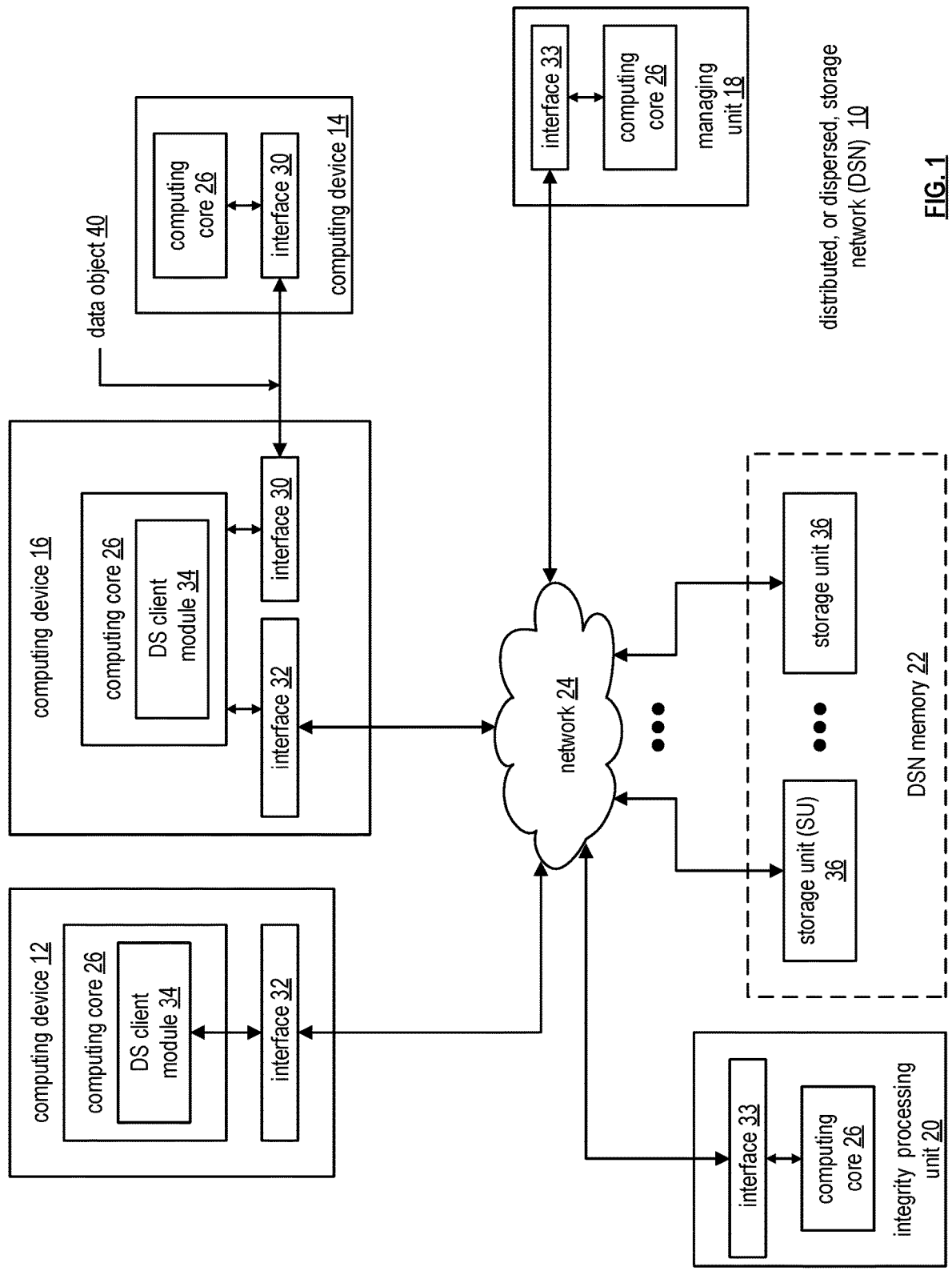
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
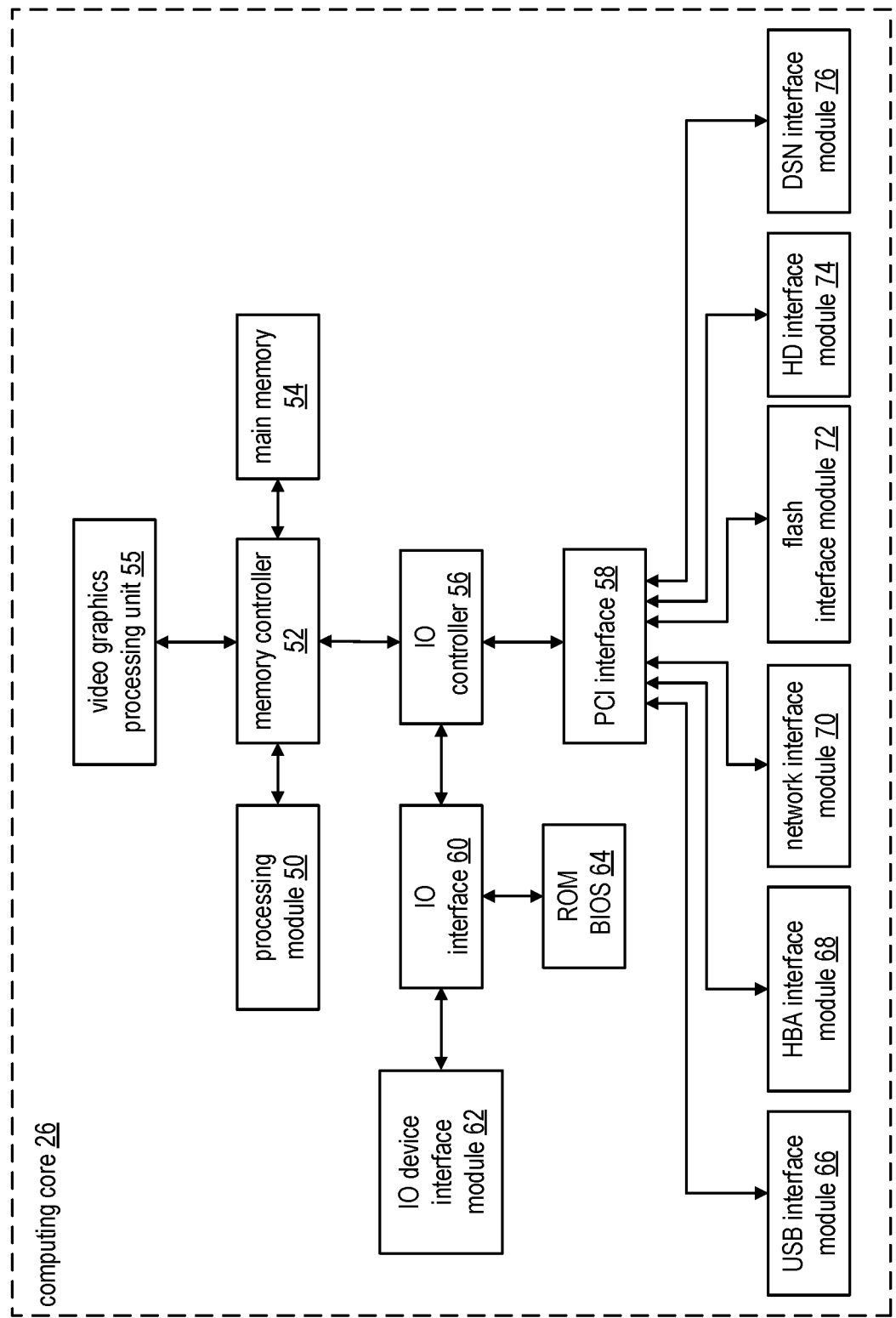
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of data rebuilding operations are discussed in greater detail below with reference to FIGS. 9-11.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
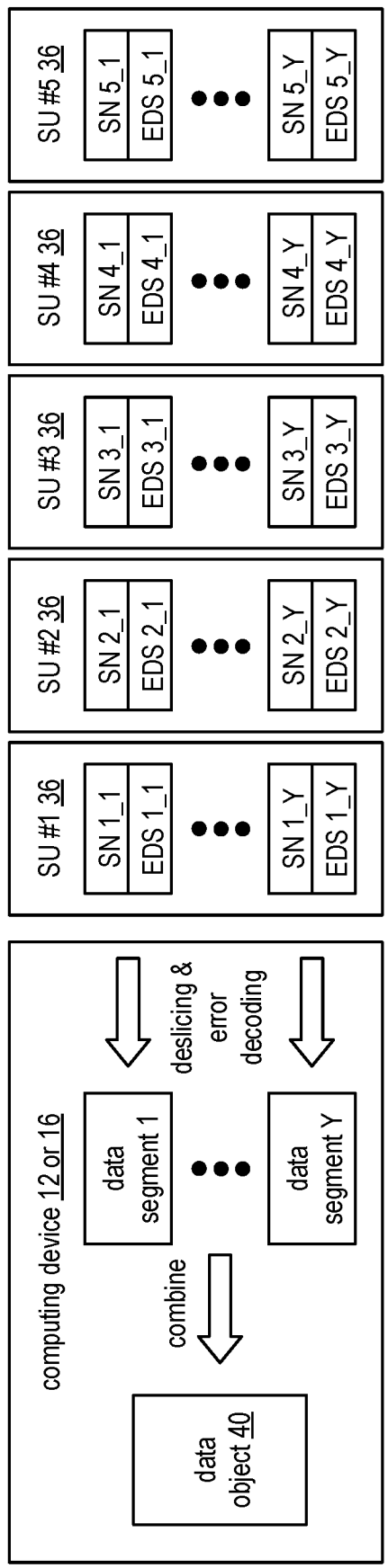
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
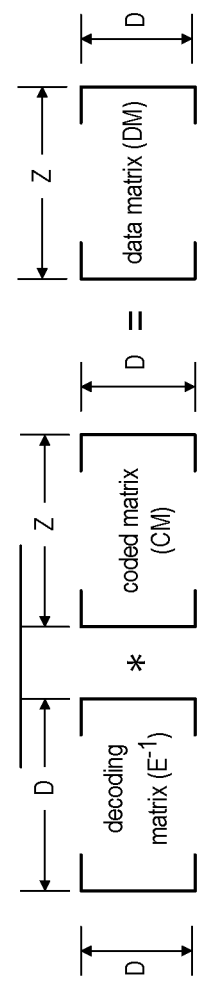
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

As described more fully below in conjunction with the examples of FIGS. 9-10, novel systems and methodologies are provided for prioritizing data rebuilding operations in storage units under certain circumstances, such as when a determined data rebuild rate compares unfavorably to a determined data loss rate. In an example, the rebuild rate represents the combined rate at which encoded data slices are replaced or rebuilt following loss, and the data loss rate is generated based on a combination of factors such as data write rates, availability status of storage units, failure rate of memory devices (hard disks, SSDs, etc.) and the amount of data contained on unavailable storage units and/or memory devices. By readjusting system priorities in circumstances when the rebuild rate is less than or otherwise compares unfavorably to the data loss rate, potentially irreversible data loss can be avoided.

Figure 9:
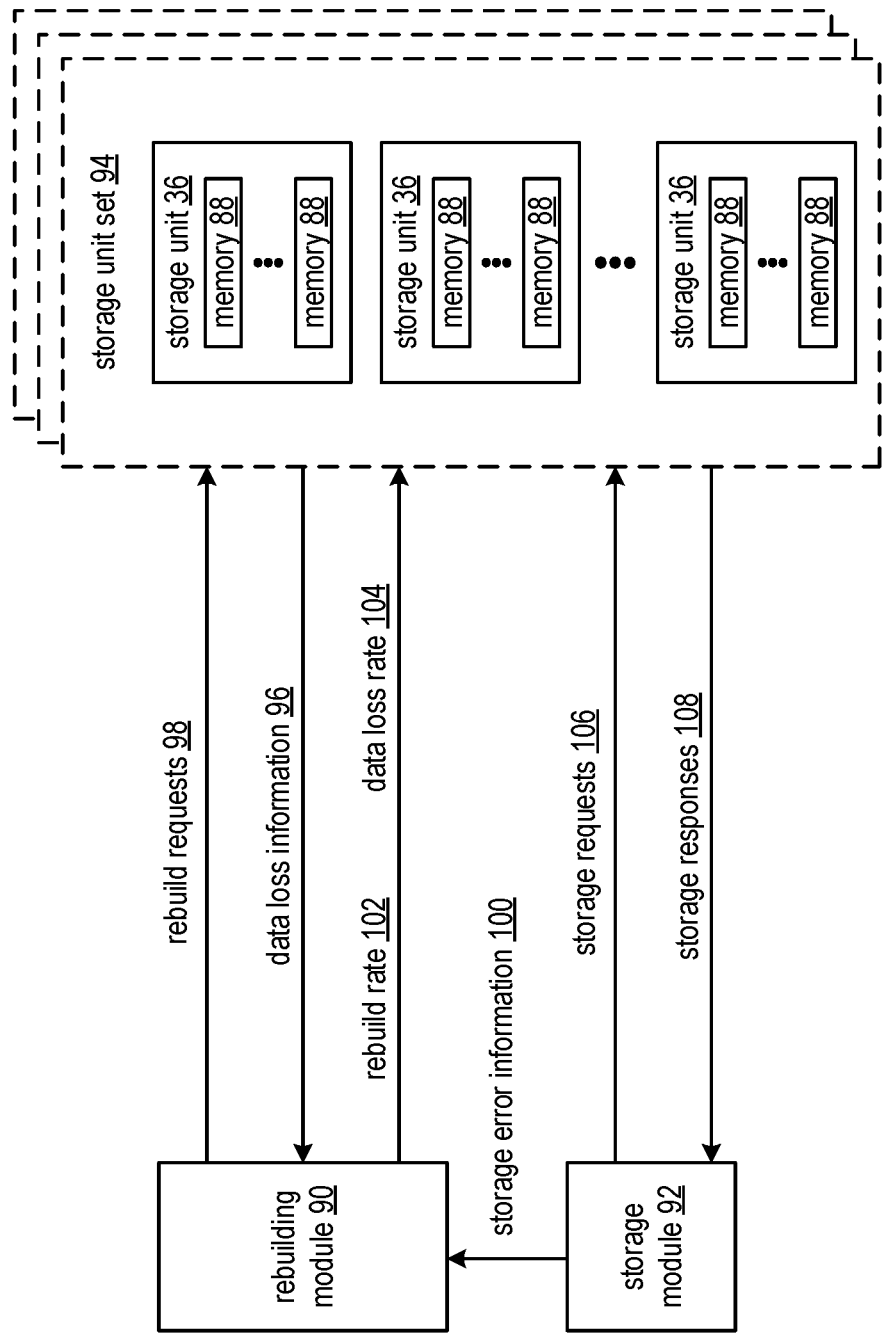
FIG. 9 is a schematic block diagram of an example of a DSN performing prioritized data rebuilding operations in accordance with an embodiment of the present disclosure.

Referring now to FIG. 9, a schematic block diagram of an embodiment of a dispersed storage network (DSN) that includes a rebuilding module 90, a storage module 92, and a storage unit set 94 is illustrated. In an embodiment, the rebuilding module 90 can be implemented utilizing the integrity processing unit 20 of FIG. 1. The storage module 92 can be implemented, for example, utilizing the computing device 16 of FIG. 1. The storage unit set 94 of the illustrated embodiment includes a set of storage units 36 of FIG. 1. Each storage unit 36 includes a plurality of memory devices 88, and in various embodiments further includes (not separately illustrated) a controller, a processing module, a distributed task execution module, and/or a DS client module 34.

The DSN of the illustrated embodiment functions to prioritize rebuilding data. The storage units 36 store sets of encoded data slices associated with data and may receive rebuild requests 98 (e.g., via the network 24 of FIG. 1) to rebuild at least some encoded data slices, and may further receive storage requests 106 to access the encoded data slices. Each storage unit 36 may not have enough processing capability to process a totality of the rebuild requests 98 and the storage requests 106 within desired time frames. The storage unit 36 utilizes a task prioritization algorithm to prioritize the totality of the rebuild requests 98 and the storage requests 106. In operation, the rebuilding module 90 collects data loss information 96 and storage error information 100, generates a rebuilding rate 102, generates a data loss rate 104, and shares the rates of rebuilding and data loss with the storage unit set 94. The storage unit 36 executes the task prioritization algorithm based on the rates of rebuilding and data loss to perform task prioritization.

The rebuild requests 98 include at least one of a request to rebuild an encoded data slice, a slice name, a request for a partially encoded slice, a request to scan a slice for error, and a request to retrieve a slice for a rebuild operation. The storage requests 106 include a write slice request that includes a slice name and an encoded data slice. The storage unit 36 may issue a storage responses 108 that include a write slice response indicating success or failure of executing a write slice request of a corresponding storage request 106. The data loss information 96 includes a rate of data loss due to slice errors (e.g., a missing encoded data slice, a corrupted encoded data slice, or a memory failure). The storage error information 100 includes a data loss rate due to data being written but not stored. For instance, a rate of data written when a storage unit was off line. The rate of rebuilding includes an aggregated rate at which encoded data slices are rebuilt following error detection. The data loss rate includes a rate based on the data loss information 96 and the storage error information 100 indicating how much data is lost per unit of time.

In an example of operation, the rebuilding module 90 receives the data loss information 96 from one or more storage units 36. The rebuilding module 90 issues rebuild requests 98 to storage units 36 when the data loss information 96 indicates at least one slice error. The rebuilding module 90 receives storage error information 100 from the storage module 92 when errors associated with storage of one or more encoded data slices occurs. As a specific example, the storage module 92 issues a set of storage requests 106 to the set of storage units 94 and receives favorable storage responses 108 from all storage units but one storage unit 36. The storage module 92 then generates the storage error information 100 to indicate that a corresponding encoded data slice of the one storage unit 36 is associated with a slice storage error. The rebuilding module 90 generates the rebuild rate 102 based on a rate of rebuilding associated with the rebuild requests 98. The rebuilding module 90 generates the data loss rate 104 based on the data loss information 96 and the storage error information 100. The rebuilding module 90 sends the rebuild rate 102 and data loss rate 104 to the storage units 36 of the storage unit set 94.

In another example of operation, each storage unit 36 receives the rebuild rate 102 and the data loss rate 104. Each storage unit 36 prioritizes received storage requests 106 and received rebuild requests 98 based on the rebuild rate 102 and the data loss rate 104. As a specific example, the storage unit 36 prioritizes the rebuild requests 98 over the storage requests 106 when the rebuild rate 102 compares unfavorably to the data loss rate 104. For instance, when the rebuild rate 102 is less than the data loss rate 104. As another instance, when the rebuild rate 102 is greater than the data loss rate 104 and a difference between the rebuild rate 102 and the data loss rate 104 is less than a predetermined (e.g., relatively low) threshold. As another specific example of the storage unit prioritizing the received storage requests 106 and the received rebuild requests 98, the storage unit 36 prioritizes the storage requests 106 over the rebuild requests 98 when the rebuild rate 102 compares favorably to the data loss rate 104. For instance, when the rebuild rate 102 is greater than the data loss rate 104 by more than a predetermined (e.g., relatively high) threshold level.

In another example of operation, an I/O scheduler within each storage unit 36 can operate to balance resources between rebuilding operations, rebalancing operations, data migration operations, and normal read/write operations to prioritize rebuilding requests over other types of operations. In the event such adjustments do not result in the desired improvements (e.g., data loss rates continue to exceed rebuild rates), in certain embodiments additional steps may be taken, such as generating warnings, e-mail alerts, error messages, etc. Additional actions that may be triggered include increasing the frequency of scanning for data that needs to be rebuilt, performing rebuilding scanning, and performing targeted scans of specific sets of storage units, vaults, storage units, disks.

In addition, inferences can be made based on rebuilding rates. For example, if the process notices rebuilding activity for a storage unit or site for which there was no prior indication of downtime/outages, the system may infer a performance failure on the storage unit or site and generate a notification. Further, integration of a rebuild rate and a data loss rate can provide statistics regarding total data lost and total data rebuilt. For a given DSN memory or sub-set thereof, the difference between these numbers yields the total amount of data remaining to be rebuilt.

Figure 10:
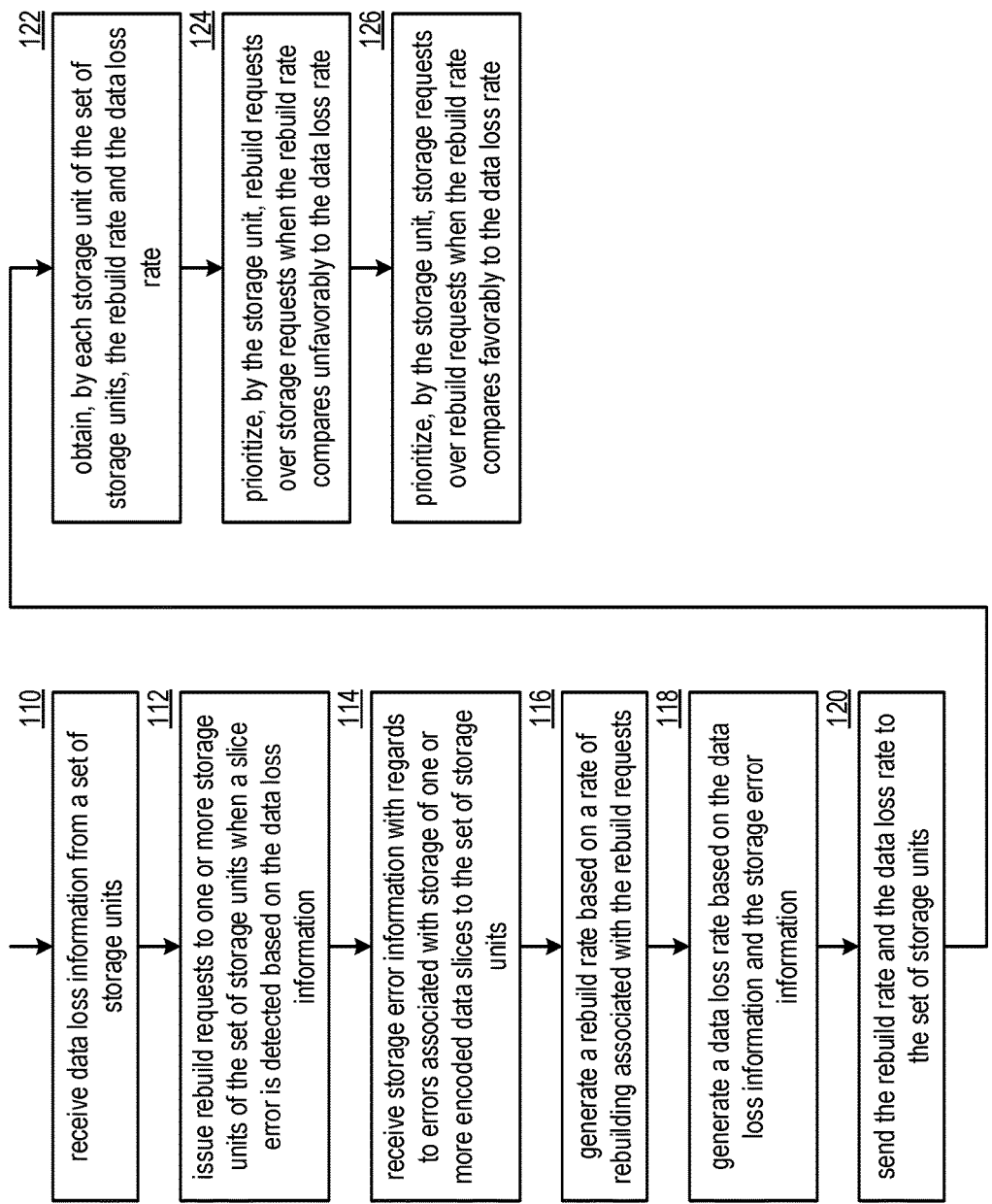
FIG. 10 is a flow diagram illustrating an example of prioritizing rebuilding of data in accordance with the present disclosure.

FIG. 10 is a flow diagram illustrating an example of prioritizing rebuilding of data in accordance with the present disclosure. The method begins with step 110 where a processing module (e.g., of a rebuilding module) receives data loss information from a set of storage units. The method continues at step 112 where the processing module issues rebuild requests to one or more storage units of the set of storage units when a slice error is detected based on the data loss information. The method continues at step 114 where the processing module receives storage error information with regards to errors associated with storage of one or more encoded data slices to the set of storage units. The method continues at step 116 where the processing module generates a rebuild rate based on a rate associated with the rebuild requests. The method continues at step 118 where the processing module generates a data loss rate based on the data loss information and the storage error information. The method continues at step 120 where the processing module sends the rebuild rate and the data loss rate to the set of storage units.

The method continues at step 122 where each storage unit of the set of storage units obtains the rebuild rate and the data loss rate. For example, the storage unit receives the rebuild rate in the data loss rate from the rebuilding module. As another example, the storage unit generates at least one of the rebuild rate and the data loss rate. The method continues at step 124 where the storage unit prioritizes rebuild requests over storage requests when the rebuild rate compares unfavorably to the data loss rate. For example, the storage unit updates a priority level indicator to prioritize. As another example, the storage unit reorders a task list placing higher priority tasks ahead of other tasks. The method continues at step 126 where the storage unit prioritizes storage requests over rebuild requests when the rebuild rate compares favorably to the data loss rate.

The methods described above in conjunction with the computing device 16, integrity processing unit 20, and storage units 36 can alternatively be performed by other modules (e.g., DS client modules 34) of a dispersed storage network or by other devices (e.g., managing unit 18). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions/program instructions can, when executed by one or more processing modules of one or more computing devices and/or by the storage units of the dispersed storage network (DSN), cause the one or more computing devices and/or the storage units to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving data loss information from a set of storage units of the DSN;
   based on the data loss information, detecting one or more slice errors associated with data stored by the set of storage units;
   in response to detecting the one or more slice errors, issuing rebuild requests to one or more storage units of the set of storage units for data associated with the one or more slice errors;
   receiving storage error information regarding errors associated with storage requests, to the set of storage units, for one or more encoded data slices;
   generating a rebuild rate based on a rate of rebuilding associated with the rebuild requests;
   generating a data loss rate based on the data loss information and the storage error information; and
   outputting the rebuild rate and the data loss rate to the set of storage units for use in determining whether to prioritize the rebuild requests.

2. The method of claim 1, further comprising:
   receiving, by a storage unit of the set of storage units, the rebuild rate and the data loss rate;
   determining, by the storage unit, whether the rebuild rate compares unfavorably to the data loss rate; and
   in response to determining that the rebuild rate compares unfavorably to the data loss rate, prioritizing, by the storage unit, the rebuild requests over the storage requests.

3. The method of claim 2, further comprising:
   in response to determining that the rebuild rate compares favorably to the data loss rate, prioritizing, by the storage unit, the storage requests over the rebuild requests.

4. The method of claim 2, wherein the rebuild rate compares unfavorably to the data loss rate when the rebuild rate is less than the data loss rate.

5. The method of claim 2, wherein the rebuild rate compares unfavorably to the data loss rate when the rebuild rate is greater than the data loss rate and a difference between the rebuild rate and the data loss rate is less than a predetermined threshold.

6. The method of claim 2, wherein the rebuild rate compares unfavorably to the data loss rate when the rebuild rate is greater than the data loss rate and a difference between the rebuild rate and the data loss rate is less than a predetermined threshold.

7. The method of claim 3, wherein the rebuild rate compares favorably to the data loss rate when the rebuild rate is greater than the data loss rate by more than a predetermined threshold.

8. The method of claim 1, wherein the data loss information includes a rate of data loss due to slice errors, the slice errors relating to at least one of missing encoded data slices, corrupted encoded data slices, or a memory failure.

9. The method of claim 1, wherein the storage error information includes a portion of the data loss rate due to data written to the set of storage units, via the storage requests, but not stored by the set of storage units, and wherein the storage requests include, respectively, a write slice request that includes a slice name and an encoded data slice.

10. The method of claim 1, wherein the rebuild requests include at least one of a request to rebuild an encoded data slice, a request for a partially encoded slice, a request to scan an encoded data slice for error, or a request to retrieve a slice for a rebuild operation.

11. A computing device of a dispersed storage network (DSN), the computing device comprises:
    a network interface;
    a memory comprising instructions; and
    one or more processing modules in communication with the memory, wherein the one or more processing modules execute the instructions to:
       receive, via the network interface, data loss information from a set of storage units of the DSN;
       based on the data loss information, detect one or more slice errors associated with data stored by the set of storage units;

in response to detecting the one or more slice errors, issue rebuild requests to one or more storage units of the set of storage units for data associated with the one or more slice errors;

receive storage error information regarding errors associated with storage requests, to the set of storage units, for one or more encoded data slices;

generate a rebuild rate based on a rate of rebuilding associated with the rebuild requests;

generate a data loss rate based on the data loss information and the storage error information; and output, via the network interface, the rebuild rate and the data loss rate to the set of storage units for use in determining whether to prioritize the rebuild requests.

12. The computing device of claim 11, wherein the data loss information includes a rate of data loss due to slice errors.

13. The computing device of claim 12, wherein the slice errors relate to at least one of missing encoded data slices, corrupted encoded data slices, or a memory failure.

14. The computing device of claim 11, wherein the storage error information includes a portion of the data loss rate due to data written to the set of storage units, via the storage requests, but not stored by the set of storage units.

15. The computing device of claim 11, wherein the rebuild requests include at least one of a request to rebuild an encoded data slice, a request for a partially encoded slice, a request to scan an encoded data slice for error, or a request to retrieve a slice for a rebuild operation.

16. A distributed storage network (DSN) comprising:
a plurality of storage units logically organized into DSN memories, each of the plurality of storage units including memory devices configured to store error encoded data slices;
a computing device coupled to the plurality of storage units;
each storage unit including a one or more processing modules in communication with a local memory comprising instructions, wherein the one or more processing modules execute the instructions to:
send, to the computing device, data loss information;
receive, from the computing device, a rebuild rate and a data loss rate, wherein the rebuild rate is based on a rate of rebuilding data associated with rebuild requests received by the plurality of storage units, and wherein the data loss rate is based on the data loss information and storage error information regarding errors associated with storage requests to the plurality of storage units;
determine whether the rebuild rate compares unfavorably to the data loss rate; and
in response to determining that the rebuild rate compares unfavorably to the data loss rate, prioritizing the rebuild requests over the storage requests.

17. The DSN of claim 16, wherein the one or more processing modules further execute the instructions to:
in response to determining that the rebuild rate compares favorably to the data loss rate, prioritizing the storage requests over the rebuild requests.

18. The DSN of claim 17, wherein the rebuild rate compares favorably to the data loss rate when the rebuild rate is greater than the data loss rate by more than a predetermined threshold.

19. The DSN of claim 16, wherein the rebuild rate compares unfavorably to the data loss rate when the rebuild rate is less than the data loss rate.

20. The DSN of claim 16, wherein the rebuild rate compares unfavorably to the data loss rate when the rebuild rate is greater than the data loss rate and a difference between the rebuild rate and the data loss rate is less than a predetermined threshold.

\* \* \* \* \*